Patented Jan. 16, 1951

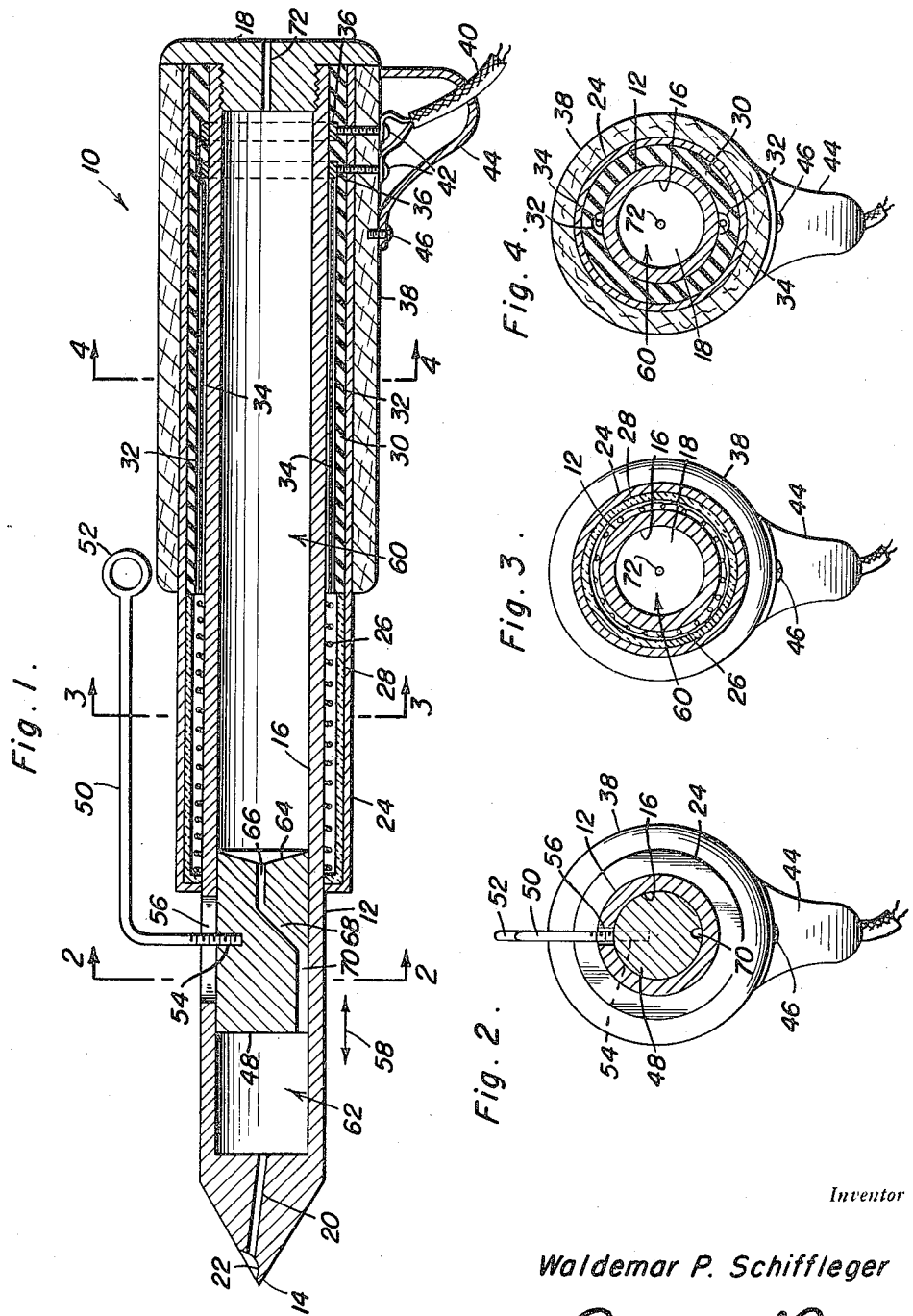
Inventor
Waldemar P. Schiffleger

2,538,474

UNITED STATES PATENT OFFICE 2,538,474

SOLDERING IRON

Waldemar P. Schiffleger, Wauwatosa, Wis.

Application November 22, 1948, Serial No. 61,405

2 Claims. (Cl. 113—109)

This invention relates to new and useful improvements and structural refinements in soldering irons, and the principal object of the invention is to provide an iron of the character herein described wherein molten solder is dispensed from the body of the iron directly to the work engaging tip.

This object is achieved by the formation of a chamber in the body of the iron, together with means for heating the chamber so that molten solder may be dispensed therefrom through a passage provided in the work engaging tip.

An important feature of the invention resides in the provision of a reciprocable plunger in the solder chamber, whereby the solder dispensing operation may be expeditiously effected.

Another feature of the invention involves the provision of conveniently manipulable means for reciprocating the solder agitating plunger.

Some of the advantages of the invention lie in its simplicity of construction, in its efficiency, and in its adaptability to economical manufacture.

With the above more important objects and features in view and such other objects and features as may become apparent as this specification proceeds, the invention consists essentially of the construction and arrangement of parts as shown in the accompanying drawings in which:

Figure 1 is a longitudinal cross sectional view of the invention;

Figure 2 is a cross sectional view, taken substantially in the plane of the line 2—2 in Figure 1;

Figure 3 is a cross sectional view, taken substantially in the plane of the line 3—3 in Figure 1, and;

Figure 4 is a cross sectional view, taken substantially in the plane of the line 4—4 in Figure 1.

Like characters of reference are employed to designate like parts in the specification and throughout the several views.

Referring now to the accompanying drawings in detail, the invention consists of a soldering iron designated generally by the reference character 10, the same embodying in its construction an elongated body 12 terminating at one end thereof in a pointed work engaging tip 14, the body 12 being provided with a cylindrical solder chamber 16 which, in turn, is equipped at one end thereof with a removable plug 18 so that solder may be inserted in the chamber, as will be clearly apparent.

The remaining end of the chamber 16 communicates with a passage 20 formed in the tip portion 14, the outer end of this passage opening into a recess or depression 22 which forms a pocket, so to speak, for the molten solder dispensed through the passage from the chamber 16.

A tubular jacket 24 is provided on the body 12 in spaced relation thereto, one end portion of this jacket containing a suitable electric heating element 26 which encircles the body 12 substantially as shown and heats the chamber 16 so that the solder placed therein is maintained in a free flowing condition. If desired, a layer of insulating material 28 may be provided between the element 26 and the jacket 24, so as to prevent or substantially minimize outward dissipation of heat.

The remaining portion of the jacket 24 contains a sleeve 30 of insulating material, which is provided in diametrically opposite sides thereof with longitudinally extending grooves 32 to accommodate a pair of electric conductors 34 supplying current to the element 26. Each of these conductors is in circuit with one of a pair of spaced rings 36 positioned in circumferential grooves provided in the sleeve 30, and it is to be noted that a tubular handle 38 is positioned on the jacket 24 so that the entire soldering iron may be conveniently grasped by the hand.

The usual two wires of an attachment cord 40 are connected to a pair of terminal screws 42 which extend through the handle 38, jacket 24 and the sleeve 30, each being in circuit with one of the rings 36, substantially as shown.

A suitable enclosure or guard 44 may be secured to the handle 38 as at 46 so as to cover the terminal screws 42, and if desired, the aforementioned plug 18 may be equipped with an enlarged head which is substantially equal in diameter to the outer diameter of the handle 38.

A reciprocable plunger 48 is provided in the solder chamber 16, the reciprocation of this plunger being effected by means of a control rod 50, one end of which is equipped with an eye 52 disposed adjacent the handle 38, while its remaining end portion is angulated and screw threaded as shown at 54. The body 12 is provided in the lateral wall thereof with a longitudinally extending slot 56 and the angulated portion 54 of the rod 50 is slidable in this slot and is secured in the plunger 48, so that by simply manipulating the eye 52 of the control rod 50, the plunger 48 may be reciprocated in the chamber 16 as indicated at 58 in Figure 1.

As will be apparent from the accompanying drawings, the plunger 48, in effect, separates the chamber 16 into two compartments 60, 62, the length of one becoming greater and the length of the other becoming lesser as the plunger is slid in one direction or the other. The end of the plunger 48 facing the compartment 60 is formed with a concaved recess 64 which merges into a central channel 66 extending longitudinally in the plunger 48 for a short distance, whereupon the channel 66 is angulated as at 68 and is disposed exteriorly on the plunger, immediately adjacent the inner wall of the chamber 16. It is to be noted that the channels 66, 68, 70 connect together the two compartments 60, 62 of the chamber 16.

In order to equalize air pressure on both sides of the plunger 48, the aforementioned plug 18 may be formed with a vent opening or aperture 72, and when the invention is placed in use, solder is inserted in the chamber 16 as has been already described and, being heated by the element 26, the solder is maintained in a free flowing condition.

The soldering iron is conveniently held by means of the handle 38, and by simply manipulating the control 50 so as to reciprocate the plunger 48 in the direction of the arrow 58, the molten solder in the compartment 60 will be caused to flow through the channels 66, 68, 70 from the compartment 60 into the compartment 62, and thence through the passage 20 to the soldering tip 14. That is to say, each time the rod 50 is pulled toward the handle 38, the depression or recess 64 will function as a scoop, so to speak, causing the solder in the compartment 60 to travel into the compartment 62. On the other hand, when the rod 50 is pushed away from the handle 38, the plunger 48 will expel the solder from the compartment 62 through the passage 20, since there is a lesser resistance to the flow of solder in this direction than there is to the flow thereof back through the channel 70, 68, 66 into the compartment 60. However, if desired, a suitable check valve (not shown) may be provided in the channel 66, 68, 70 to prevent rearward flow of solder.

It will be noted that by virtue of the obliquely extending channel portion 68 the channel portion 70 is disposed immediately adjacent the heated wall of the body 12, so that excessive cooling of solder in the plunger 48 is prevented.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a soldering iron, the combination of a tubular body having front and rear ends and affording a chamber for liquid solder, a conical soldering tip provided at the front end of said body and provided with a solder outlet passage in communication with said chamber, the rear end portion of said body constituting a handle, a removable filler plug provided at the rear end of the body and having a vent aperture in communication with the chamber, a reciprocable plunger positioned intermediate the ends of said chamber and separating the latter into front and rear compartments, said body being provided in its lateral wall with a longitudinal slot covered by said plunger, and an L-shaped actuating rod secured at one end thereof to said plunger and extending outwardly through said slot, said actuating rod affording a straight portion disposed exteriorly of and in spaced parallel relation to the body and terminating at its free end in a finger piece adjacent said handle, said plunger being provided with a longitudinal solder transmitting channel connecting said front and rear compartments.

2. The device as defined in claim 1 wherein at least a portion of the length of said channel is open sided and disposed contiguously with the wall of said chamber.

WALDEMAR P. SCHIFFLEGER.

REFERENCES CITED

The following references are of record in the file of this patent:

UNITED STATES PATENTS

| Number | Name | Date |
| --- | --- | --- |
| 1,760,519 | Palmer | May 27, 1930 |
| 2,054,506 | Leitsch | Sept. 15, 1936 |
| 2,423,900 | Parker | July 15, 1947 |
| 2,452,360 | Dunham | Oct. 26, 1948 |